Patented Sept. 13, 1927.

1,642,089

UNITED STATES PATENT OFFICE.

ARTHUR SCHREIER, OF VIENNA, AUSTRIA, ASSIGNOR, BY MESNE ASSIGNMENTS, TO GENERAL ZEOLITE COMPANY, OF CHICAGO, ILLINOIS, A CORPORATION OF ILLINOIS.

PROCESS AND MATERIAL FOR STERILIZATION OF LIQUIDS.

No Drawing. Application filed January 8, 1921, Serial No. 435,944, and in Austria January 8, 1920.

This invention relates generally to preserving and the like and pertains particularly to a process for the killing of micro-organisms in fluid, and a new material designed for use in practicing the process.

The general purpose of the invention is the provision of a process and a material which may be employed effectively to free fluids from bacteria or micro-organisms which are dangerous to health, or which are destructive of organic fluids.

A more particular purpose is the provision of such method and material designed particularly for the treatment of fluids used for human consumption, such as milk, water, fruit juices and the like, and which is characterized by the important features of rendering the fluid absolutely sterile so far as dangerous micro-organisms are concerned, without lessening in any degree its potability, wholesomeness, nutritive quality, or suitability for the intended use.

The essential characteristic of the process constituting my invention is the subjection of the treated liquid to contact with a coating or deposit, such as a colloidal coating, of a selected metal in such fashion that the liquid is brought into intimate contact therewith, and the said coating or colloidal deposit being of a relatively stable and insoluble nature, so that the effect of the liquid in breaking it down is practically imperceptible. The nature of the material constituting my invention, is an article of manufacture comprising a suitable base or carrier of solid and resistant material upon which is carried the metal coating exposed for contact with the treated liquid. It has been known heretofore that certain of the heavy metals and their salts in very weak, and often chemically indiscernible dilutions act as strong poisons on bacteria and algæ, being effective either to kill these or effectively deter or inhibit their growth. Employment of these capabilities of metals heretofore have been limited, so far as I am aware, to the use of certain salts of certain metals, such as copper sulphate, and in uses where a careful limitation of the quantity is not essential, such as for destroying algæ in ponds, and the like. The treatment of liquids designed for human consumption, however, and particularly organic liquids, has never, to my knowledge, been accomplished in a successful commercial manner or scale, because of the difficulties attendant upon the use of the materials in the forms heretofore employed, due to the necessity for very careful dosage, a thorough mixture with the treated liquid, and an absolute avoidance of over-dosage as essential prerequisites. By the use of my improved method and material, these difficulties and dangers are completely obviated, and the treatment is reduced to a process of the utmost simplicity.

As a preferred manner of practicing the process, I employ a suitable clean and stable granular material, such as quartz sand, the granules of which are covered or coated with a metal. For such metal I prefer silver, and as a form in which it may be applied to the sand grains, I prefer a colloidal solution, illustration of which is a well know mixture for silvering mirrors and consisting in the main, of a silver solution and a reducing solution such as sugar, formaldehyde, or the like, and an alkali as ammonia. A suitable formula for the preparation of such a mixture is the following: 7 parts by weight of $\frac{1}{10}$ normal solution of silver nitrate (16.8 grams of $AgNO_3$ in 1 liter of distilled water) are diluted with 3 parts of distilled water. To the said proportions of the diluted solution of silver nitrate, 0.3 parts of a solution of formaldehyde (percentage: 40) are admixed. Then 4.7 parts of $\frac{1}{10}$ normal ammonia solution (1.7 grams $NH_3$ in 1 liter of distilled water) are added and admixed thereto by agitating.

This mixture is applied to the intended carrying material in a suitable fashion to cause it to form a relatively stable and insoluble surface coating thereon. As a manner whereby the mixture above described may be applied to quartz grains, sand, or other granular or pulverulent material, the following may be employed: The above specified solution of silver nitrate admixed with formaldehyde is brought in contact with the washed and cleaned quartz sand within a suitable vessel, so that the liquid solution completely covers the quartz grains and the air contained in the sand may be completely expelled by stirring or agitating.

Then further quantities of the above specified solution of silver nitrate are added while agitating the whole, and after a short time the liquid darkens, as do also the grains, which now being coated will be washed finally.

Quartz grains when so treated show a brown to silver white coating of colloidal silver which adheres tightly to the grains.

The liquid to be treated is subjected to contact with a material thus prepared, in any suitable fashion, such as by filtering the liquid through a layer of the coated granular material, or agitating a quantity of the coated granular material in a volume of the liquid. The desired result obtainable by the employment of a granular material as the carrying base for the metallic coating, is the possibility of bringing the liquid into intimate contact with the metal coating without the employment of highly specialized apparatus or involved handling operations. It will be obvious that the desired intimate contact between the liquid and the metal coatings may be most effectively attained by the percolation of the liquid through a substantial layer of the granular material disposed as a filter bed. In such employment the process may be carried on continuously and without the necessity of special handling of the liquid, as the bed of treating material may be arranged in a commercial filter in conjunction with the ordinary filter bed in such relationship that the latter is rendered effective upon the treated liquid first, so that it may extract material in suspension and prevent deposit of the same upon the metal coated material, to as complete an extent as possible. Use has demonstrated that treatment of liquids in this fashion is effective to destroy or incapacitate destructive micro-organisms in them. Milk so treated will not sour if protected from fresh inoculation, and the same is true of fruit syrups and other organic mixtures, while water may be effectively cleared of dangerous germ life. While I am not prepared to state definitely or with assurance what actually takes place in such treatment of liquids, it would appear that in the process the colloidal metal thus distributed over a large surface exposed to the treated liquid, is diffused by the latter in very small quantities, and that the metal has some special affinity for the organisms in the liquid when they are brought into contact and exercise a very strong bactericidal effect. A remarkable feature of the operation resides in the fact that the amount or the extent of the metal coating is not perceptibly decreased by extended and repeated use of the coated material. Upon repeated use of the material on liquids containing certain ingredients, however, it has been observed that the silver coatings become fouled or covered with accretions derived or deposited out of the treated liquid, and it will be obvious that such accretions are effective to result in a decrease of the activity of the coated material. These disabling accretions may be removed from the coated granular material by back washing, or agitation in a cleansing fluid.

Instead of using the quartz grains or sand as above described, other substances, of course, may be utilized, such as glass, pumice stone, or the like, in granular or pulverized form, coated as above described; or the coating may be retained on the surfaces of the plates, vessels, conduits or other locations where the treated liquid may be intimately impinged upon it. Furthermore, instead of using silver as the coating metal, other metals may be employed, such as platinum, gold, and copper. In all instances, however, I have found it of signal advantage that the coatings be applied over the largest possible surface, and that the granular material be subjected to the minutest possible sub-division and coatings applied most intimately to the treated material.

It will be obvious that the process may be utilized with any liquid, and is most advantageously applicable to the treatment of liquids wherein the addition of chemicals of any kind is to be avoided. This consideration particularly adapts the process for the treatment of liquids meant for human consumption. It is obvious also that the process may be utilized for the sterilization of the solid content of a liquid, or non-fluid material, by the subjection of a suitable vehicle, such as water, to the necessary contact with the metal coated material, and the subsequent application of such liquid to the non-fluid material to be protected.

A particular advantage, from the commercial aspect, of this process lies in the fact that there is no necessity for measuring or apportioning the material, as in the case of chemical treatment of liquids, as amounts which are sufficient to effect sterilization are too minute for measurement by ordinary methods, and that there is no reasonable danger of over treatment or over dosage whereby the treated liquid may be rendered unfit for use, and furthermore that the simplicity with which the process may be practiced renders its employment extremely economical.

I claim:

1. In the method described, the step of exposing liquid to the action of silver coated sand particles.

2. The method of sterilizing a liquid including the step of draining the liquid through a bed of silver coated sand particles.

3. The method of sterilizing liquid including the steps of silver coating sand particles, arranging said particles in bed formation, and permitting the liquid to percolate through the bed of particles.

4. In a sterilizer for liquids, a bed of silver coated sand particles through which the liquids percolate.

5. A method of sterilizing a liquid which comprises subjecting the liquid to contact with a carrier having a surface deposit of silver.

6. A process of treating fluids which comprises contacting the fluid with active silver.

7. A process of sterlizing liquids which comprises contacting the liquid with a carrier material having a colloidal coating of a not readily corrodible, bactericidal metal.

8. A process of sterilizing fluids which comprises contacting the fluid with a not readily corrodible bactericidal metal in colloidal condition.

9. A process of sterilizing fluids which comprises contacting the fluid with a metal in bactericidal condition.

10. A sterilizing material comprising a carrier with a surface deposit of silver.

11. A sterilizing material comprising a carrier having a deposit of a metal in bactericidal condition.

12. A sterilizing material comprising a carrier with a colloidal deposit of a not readily corrodible bactericidal metal.

In testimony whereof I have hereunto signed my name.

ARTHUR SCHREIER.